United States Patent
Romeo et al.

(10) Patent No.: US 11,568,145 B1
(45) Date of Patent: Jan. 31, 2023

(54) CONTEXTUAL NATURAL LANGUAGE UNDERSTANDING FOR CONVERSATIONAL AGENTS

(71) Applicant: Amazon Technologies, Inc., Seattle, WA (US)

(72) Inventors: Salvatore Romeo, Mountain View, CA (US); Yi Zhang, Sammamish, WA (US); Garima Lalwani, Sunnyvale, CA (US); Meghana Puvvadi, Seattle, WA (US); Rama Krishna Sandeep Pokkunuri, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/038,506

(22) Filed: Sep. 30, 2020

(51) Int. Cl.
*G06F 40/289* (2020.01)
*G06F 40/40* (2020.01)
*H04L 51/04* (2022.01)

(52) U.S. Cl.
CPC ........... *G06F 40/289* (2020.01); *G06F 40/40* (2020.01); *H04L 51/04* (2013.01)

(58) Field of Classification Search
CPC ......... G06F 40/289; G06F 40/40; H04L 51/04
USPC .......................................................... 704/9
See application file for complete search history.

(56) References Cited

U.S. PATENT DOCUMENTS

| | | | |
|---|---|---|---|
| 8,204,751 B1 | 6/2012 | Di et al. | |
| 10,761,866 B2 * | 9/2020 | Liu | H04L 51/02 |
| 10,860,629 B1 | 12/2020 | Gangadharaiah et al. | |
| 10,984,034 B1 | 4/2021 | Sandland et al. | |
| 2019/0325081 A1 | 10/2019 | Liu et al. | |
| 2019/0362020 A1 | 11/2019 | Paulus et al. | |
| 2019/0385595 A1 | 12/2019 | Wabgaonkar et al. | |

OTHER PUBLICATIONS

Advisory Action, U.S. Appl. No. 16/455,165, dated Feb. 25, 2022, 12 pages.
Bahdanau et al., "Neural Machine Translation by Jointly Learning to Align and Translate", ICLR 2015, arXiv:1409.0473v7 [cs.CL], May 19, 2016, pp. 1-15.
Bhargava et al., "Easy Contextual Intent Prediction and Slot Detection", 2013 IEEE Conference on Acoustics, Speech and Signal Processing (ICASSP), Oct. 2013, pp. 8337-8341.

(Continued)

*Primary Examiner* — Thierry L Pham
(74) *Attorney, Agent, or Firm* — Nicholson De Vos Webster & Elliott LLP

(57) ABSTRACT

Systems, methods, and apparatuses for contextual natural language understanding are detailed. An exemplary method includes receiving a user utterance provided by a user within a multi-turn chat dialog between the user and a conversational agent; providing to a contextual natural language understanding framework: the user utterance, and contextual information associated with one or more previous turns of the multi-turn chat dialog, the contextual information associated with each turn of the one or more previous turns including a previous intent, a previous dialog act, and an elicited slot; and obtaining, from the contextual natural language understanding framework, an intent classification and one or more slot labels.

20 Claims, 9 Drawing Sheets

(56) References Cited

OTHER PUBLICATIONS

Bordes et al., "Learning End-To-End Goal-Oriented Dialog", ICLR 2017 conference submission, arXiv:1605.07683v4 [cs.CL], Mar. 30, 2017, pp. 1-15.

Devlin et al., "BERT: Pre-training of Deep Bidirectional Transformers for Language Understanding", NAACL-HLT, vol. 1, 2019, pp. 4171-4186.

Final Office Action, U.S. Appl. No. 16/455,165, dated Dec. 7, 2021, 39 pages.

Gehring et al., "Convolutional Sequence to Sequence Learning", Proceedings of the 34th International Conference on Machine Learning, vol. 70, arXiv:1705.03122v3 [cs.CL], Jul. 25, 2017, pp. 1-15.

Goo et al., "Slot-Gated Modeling for Joint Slot Filling and Intent Prediction", Proceedings of NAACL-HLT, Jun. 1-6, 2018, pp. 753-757.

Guo et al., "Joint Semantic Utterance Classification and Slot Filling with Recursive Neural Networks", 2014 IEEE Workshop on Spoken Language Technology (SLT 2014), Dec. 2014, pp. 554-559.

Gupta et al., "Simple, Fast, Accurate Intent Classification and Slot Labeling for Goal-Oriented Dialogue Systems", Proceedings of the 20th Annual SIGdial Meeting on Discourse and Dialogue, Jan. 2019, arXiv:1903.08268v2 [cs.CL], Jul. 17, 2019, 10 pages.

Jeong et al., "Triangular-Chain Conditional Random Fields", IEEE Transactions on Audio, Speech, and Language Processing, vol. 16, No. 7, Sep. 2008, pp. 1287-1302.

Kingma et al., "Adam: A Method for Stochastic Optimization", International Conference for Learning Representations, arXiv:1412.6980v9 [cs.LG], Jan. 30, 2017, pp. 1-15.

Li et al., "A Self-Attentive Model with Gate Mechanism for Spoken Language Understanding", Proceedings of the 2018 Conference on Empirical Methods in Natural Language Processing, Oct. 31-Nov. 4, 2018, pp. 3824 3833.

Liu et al., "Attention-Based Recurrent Neural Network Models for Joint Intent Detection and Slot Filling", Interspeech 2016, arXiv:1609.01454v1 [cs.CL], Sep. 6, 2016, 5 pages.

Miller et al., "Key-Value Memory Networks for Directly Reading Documents", EMNLP 2016, arXiv:1606.03126v2 [cs.CL], Oct. 10, 2016, 10 pages.

Non-Final Office Action received for U.S. Appl. No. 16/455,165, dated Jul. 1, 2021, 30 pages.

Ren et al., "Towards Universal Dialogue State Tracking", Proceedings of the 2018 Conference on Empirical Methods in Natural Language Processing, arXiv:1810.09587v1 [cs.CL], Oct. 22, 2018, 7 pages.

Shen et al., "DiSAN: Directional Self-Attention Network for RNN/CNN-Free Language Understanding", AAAI 2017, arXiv:1709.04696v3 [cs.CL], Nov. 20, 2017, 10 pages.

Shi et al., "Contextual Spoken Language Understanding Using Recurrent Neural Networks", IEEE International Conference on Acoustics, Speech and Signal Processing (ICASSP), Apr. 2015, 5 pages.

Strubell et al., "Fast and Accurate Entity Recognition with Iterated Dilated Convolutions", Proceedings of the 2017 Conference on Empirical Methods in Natural Language Processing, arXiv:1702.02098v3 [cs.CL], Jul. 22, 2017, 13 pages.

Sukhbaatar et al., "End-To-End Memory Networks", Advances in Neural Information Processing Systems (NIPS 2015), arXiv:1503.08895v5 [cs.NE], Nov. 24, 2015, pp. 1-11.

Sun et al., "VideoBERT: A Joint Model for Video and Language Representation Learning", 2019 IEEE/CVF International Conference on Computer Vision (ICCV), 2019, pp. 1-13.

Vaswani et al., "Attention Is All You Need", NIPS 2017, arXiv:1706.03762v5 [cs.CL], Dec. 6, 2017, 15 pages.

Wen et al., "A Network-based End-to-End Trainable Task-oriented Dialogue System", Proceedings of the 15th Conference of the European Chapter of the Association for Computational Linguistics: vol. 1, Long Papers, arXiv:1604.04562v3 [cs.CL], Apr. 24, 2017, 12 pages.

Weston et al., "Memory Networks", ICLR 2015, arXiv:1410.3916v11 [cs.AI,] Nov. 29, 2015, pp. 1-15.

Williams et al., "The Dialog State Tracking Challenge Series", AI Magazine, Competition Reports, vol. 35 No. 4, Winter 2014, pp. 121-124.

Xu et al., "Joint Intent Detection and Slot Filling using Convolutional Neural Networks", IEEE Automatic Speech Recognition and Understanding Workshop, Dec. 2013, 6 pages.

Zeiler, Matthew D., "Adadelta: An Adaptive Learning Rate Method", CoRR, arXiv:1212.5701v1 [cs.LG], Dec. 22, 2012, 6 pages.

Zhong et al., "Global-Locally Self-Attentive Dialogue State Tracker", Annual Meeting of the Association for Computational Linguistics (ACL), arXiv:1805.09655v3 [cs.CL], Sep. 6, 2018, 10 pages.

Non-Final Office Action, U.S. Appl. No. 16/455,165, dated Jun. 16, 2022, 29 pages.

Napolitano Lia T, Mar. 27, 2017, Intelligent Automated Assistant in a Media Environment (Year 2017).

Notice of Allowance, U.S. Appl. No. 16/455,165, dated Oct. 7, 2022, 10 pages.

Notice of Allowance, U.S. Appl. No. 16/455,165, dated Oct. 26, 2022, 2 pages.

* cited by examiner

CONTEXTUAL NATURAL LANGUAGE UNDERSTANDING FOR CONVERSATIONAL AGENTS

BACKGROUND

Contextual Natural Language Understanding (NLU) in task-oriented dialogs captures the meaning of user utterances through Intent Classification (IC) and Slot Labeling (SL) over a sequence of conversation turns. The success of such dialog systems requires the accurate recognition of intent together with their associated semantic entities (if any) during each turn of the conversation, in order to complete the tasks that the user wants to achieve. Conversational context, including the current dialog state and the turn history, contains additional information for more accurate interpretation of user utterances. In recent years, pre-trained language models (LM) have proven to be powerful and versatile for many downstream NLP tasks. While prior work has explored the use of contextual information to better identify intents and slots for the current turn, in this work we propose a novel approach to combine a pre-trained LM (e.g. BERT) with a self-attention-based mechanism for context fusion. Experiments show that the self-attention based approach out-performs alternative context fusion models, and achieves significant improvement over previously reported state-of-the-art models on both public and customer benchmarking datasets.

BRIEF DESCRIPTION OF DRAWINGS

Various embodiments in accordance with the present disclosure will be described with reference to the drawings, in which.

DETAILED DESCRIPTION

Figure 1:
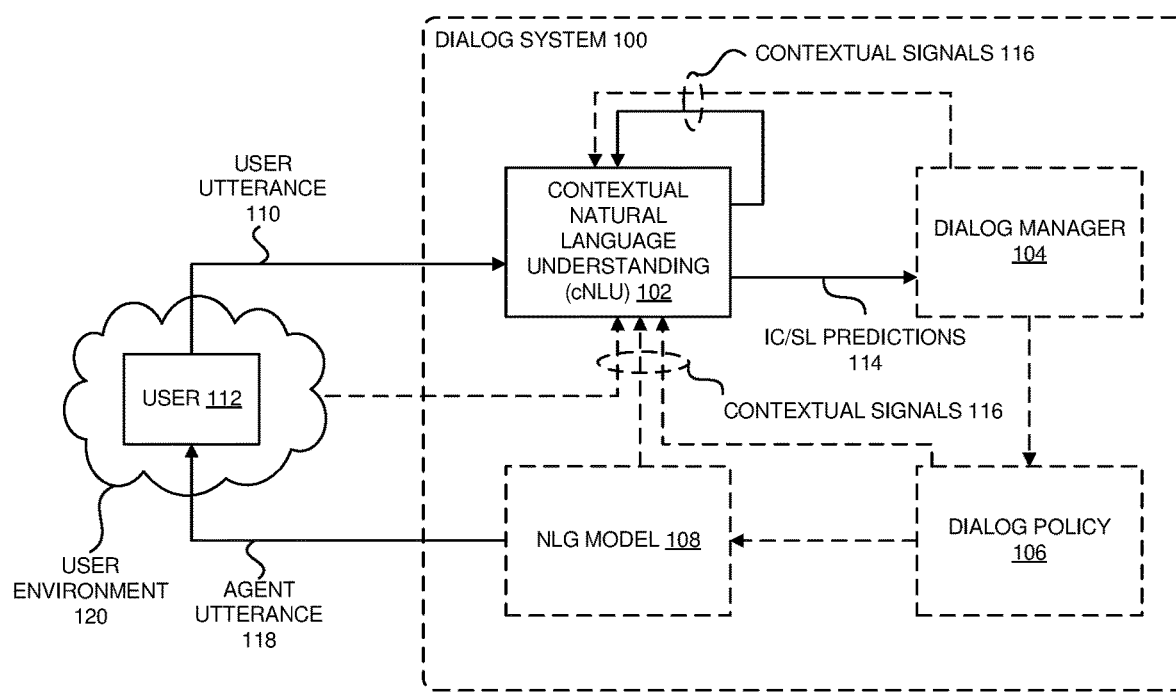
FIG. 1 is a diagram illustrating an environment for a dialog system including a contextual natural language understanding (cNLU) model according to some embodiments.

Various embodiments of methods, apparatus, systems, and non-transitory computer-readable storage media are described for a contextual natural language understanding (cNLU) framework that is able to incorporate contextual signals including at least one or more of: a previous intent, a previous (system/bot) dialog act, a previous elicited slot, and/or a previous utterance to perform joint intent classification (IC) and slot labeling (SL). According to some embodiments, a user utterance provided by a user within a multi-turn chat dialog between the user and a conversational agent is received. The user utterance and contextual information associated with one or more previous turns of the multi-turn chat dialog is provided to a cNLU framework which includes at least one machine learning (ML) model. In one embodiment, the contextual information is included as a part of a session request (e.g., a putsession request). An intent classification and one or more slot labels for the user utterance are then obtained from the cNLU framework. The cNLU framework described herein thus uses, in addition to a current utterance itself, various contextual signals as input to generate IC and SL predictions for each utterance of a multi-turn chat dialog. In some embodiments, the model is further configured to intelligently select which signals to include, and which signals to ignore, when considering the collection of contextual information.

The use of smart conversational agents is becoming widespread—for example, such agents can be found in smart speakers, smartphones, and many other devices and applications. The foundation of such conversational agents is a dialogue system. In many cases, these dialogue systems cater to task-oriented dialogues where a user is trying to achieve a goal such as, for example, booking an airline flight, ordering food from a restaurant, or scheduling an appointment. For such systems to operate successfully, the dialogue system strives to understand a user's goals and requests at each turn of the dialogue.

Natural language understanding (NLU) is an important component of such dialog systems and, in particular, for capturing semantic information from a user's utterances at each turn of a dialogue with a smart conversational agent. At a high level, NLU in this context involves two tasks: intent classification (IC) and slot labeling (SL). An intent in the context of IC identifies the goal underlying an expressed utterance (that is, what the user is trying to achieve with the utterance), and slots identify optional parameters of these intents (that is, information provided by the user in the utterance that is relevant to the user's intent).

In many existing dialog systems, NLU is followed by a rule-based dialogue management (DM) component. The NLU components in existing dialog systems thus largely process utterances in isolation and push the problem of context management to downstream components. However, contextual information is often highly relevant to the correct interpretation of intents during the NLU stage since the intent of a user's utterance often needs to be interpreted in the context of a conversation. Embodiments described herein relate to a contextually-sensitive NLU framework, or cNLU framework, including example cNLU frameworks that enable contextual information to be taken into consideration during IC and SL, thereby providing more signals to the dialogue management and other components further down the pipeline. In contrast to existing NLU strategies, the embodiments described herein explicitly model more comprehensive contextual information for training IC and SL tasks, for example, by leveraging previous utterances, dialogue acts, intent classifications, and slot labels.

Pre-trained language models (LM) have advanced the state-of-the-art in many natural language processing applications through self-supervised learning with large unannotated corpus. In combination with powerful and versatile neural network architectures like Transformer, the pre-training & fine-tuning approach has become the de facto standard in the new era of NLP research. However, in real-world applications, the proper and thorough understanding of natural language often requires additional sophisticated representation of context in which human language is used, which might involve extra-linguistic knowledge. The success of the model crucially depends on the tight integration of language representation with additional information.

FIG. 1 is a diagram illustrating an environment for an example dialog system including a cNLU framework according to some embodiments. As shown in FIG. 1, the dialog system 100 includes a cNLU framework 102 and other optional components including a dialog manager 104, dialog policy component 106, and natural language generation (NLG) model 108, among other possible components. At a high level, the dialog system 100 receives user utterances (e.g., a user utterance 110) from users (e.g., a user 112), uses a cNLU framework to generate IC/SL predictions 114 (based on both the user utterance 110 and other contextual signals 116, as described in more detail herein), passes the IC/SL predictions 114 to a dialog manager 104 that maintains state information related to the dialog, a dialog policy manager that decides on a next action to be performed by the system based on data from the cNLU framework 102 and dialog manager 104, and finally a NLG component which forms a reply that is converted into an agent utterance 118 (e.g., a text-based reply, voice-based reply, or the like) that can be understood by the user 112. Examples of a cNLU framework 102 are described in more detail in sections hereinafter.

In some embodiments, one or more components of a dialog system 100 are implemented at least in part using resources provided by a provider network. A provider network provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks may utilize one or more user accounts that are associated with a customer account, though these terms may be used somewhat interchangeably depending upon the context of use. Users may interact with a provider network across one or more intermediate networks (e.g., the internet) via one or more interface(s), such as through use of application programming interface (API) calls, via a console implemented as a website or application, etc. The interface(s) may be part of, or serve as a front-end to, a control plane of the provider network that includes "backend" services supporting and enabling the services that may be more directly offered to customers.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

As indicated above, conversational agents continue to evolve and the conversations that occur with such agents are becoming increasingly complex. The complexity of these conversations in part involves the need to rely more on contextual cues to interpret each utterance of a multi-turn dialogue. In existing NLU frameworks, the resolution of utterances in context is typically addressed in the DM component of the system using rule-based dialogue state trackers.

However, this arrangement pushes the problem of contextual understanding further down the dialogue pipeline. Despite the appeal of the modular design, this arrangement can often result in various types of cascading errors and other issues at the NLU stage.

According to embodiments described herein, a cNLU framework is described that mitigates many of the issues described above while still maintaining a modular and interpretable framework. At a high level, the cNLU framework is configured to take into account various types of contextual information during the IC and SL tasks, thereby providing more signals to the dialogue management components further down the pipeline. Compared to previous NLU strategies, the cNLU framework explicitly models more comprehensive contextual information training IC and SL tasks by leveraging previous utterances, dialogue acts, and previous intent classes and slot labels, among other possible signals. As shown in FIG. 1, these contextual signals 116 can be obtained from the cNLU framework itself, from other components of the dialog system 100 (e.g., a dialog manager 104, dialog policy 106 component, and/or NLG model 108) as well as from a user environment 120 (e.g., information about a user's location, time of day, etc.), or any combinations thereof.

Figure 2:
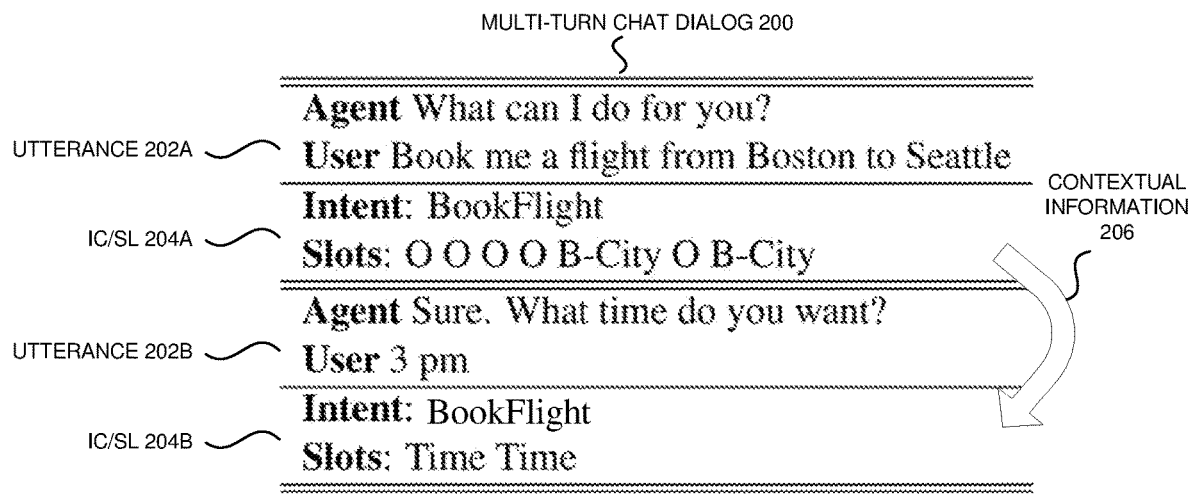
FIG. 2 is a diagram illustrating an example of identified intent classification (IC) and slot label (SL) predictions for an example user utterance according to some embodiments.

FIG. 2 illustrates an example of a multi-turn chat dialog. The example multi-turn chat dialog 200 illustrated in FIG. 2 shows two turns along with IC/SL predictions generated for each turn. In the example of FIG. 2, in response to the prompt from the agent, a user provides a first utterance 202A: "Book me a flight from Boston to Seattle." In response to receiving this utterance, a cNLU framework 102 generates IC and SL predictions IC/SL 204A, indicating that it was determined that the intent was "BookFlight" and that slot labels were determined for each token of the utterance, including indications that "Boston" and "Seattle" refer to cites relevant to the user's intent.

Similarly, a user provides a second utterance 202B in response to the agent's next prompt requesting a time from the user: "3 pm." As illustrated in the examples described herein, a cNLU framework again generates IC and SL predictions IC/SL 204B based on the user's second utterance 202B but also based at least in part on contextual information 206 associated with the multi-turn chat dialog 200 as a whole such as, for example, the previous utterance 202A, previous IC/SL 204A, and previous dialog act. Although only two turns are shown in the example chat dialog 200 illustrated in FIG. 2, in general, a multi-turn chat dialog can include any number of turns between a user and an agent and a cNLU framework 102 can take into account contextual information related to any number of previous turns in the conversation.

In some embodiments, a cNLU framework 102 is formalized generally as follows. For a conversation with n turns:

> Agent Utterances: A = {$a_1, a_2, \ldots, a_n$}
> User Utterances: U = {$u_1, u_2, \ldots, u_n$}
> Intents: I = {$i_1, i_2, \ldots, i_n$}
> Slot Labels: SL = {$sl_1, sl_2, \ldots, sl_n$}
> Dialog Acts: DA = {$da_1, da_2, \ldots, da_n$}
> Slot Elicitation: SLE = {$sle_1, sle_2, \ldots, sle_n$}

In the formulation above, a dialog act refers to the actions taken by an agent such as "Close" (for example, when an intent is fulfilled), "ConfirmIntent," "ElicitSlot," and so forth. A slot elicitation indicates the slot(s) to elicit when the dialog act is "ElicitSlot."

In a traditional NLU system, for a turn t in a multi-chat dialog, the intents and slots are given by:

$$i_t, sl_t = f_{no\_context}(u_t)$$

where $f_{no\_context}$ context is typically implemented by an encoder-decoder architecture with attention. As the formulation above indicates, for a given user utterance $u_t$, existing NLU systems predict an IC and a set of one or more SLs based solely on the user utterance itself and without reference to other contextual information related to the multi-turn dialog of which the utterance is a part.

According to embodiments described herein, for a multi-turn chat dialog with a context window of K, and for turn t, a cNLU framework instead provides the intents and slots by: $i_t, sl_t = f_{context}(u_t, c_t)$. To learn this $f_{context}$, in some embodiments, contextual signals are leveraged along with the current utterance.

Figure 3:
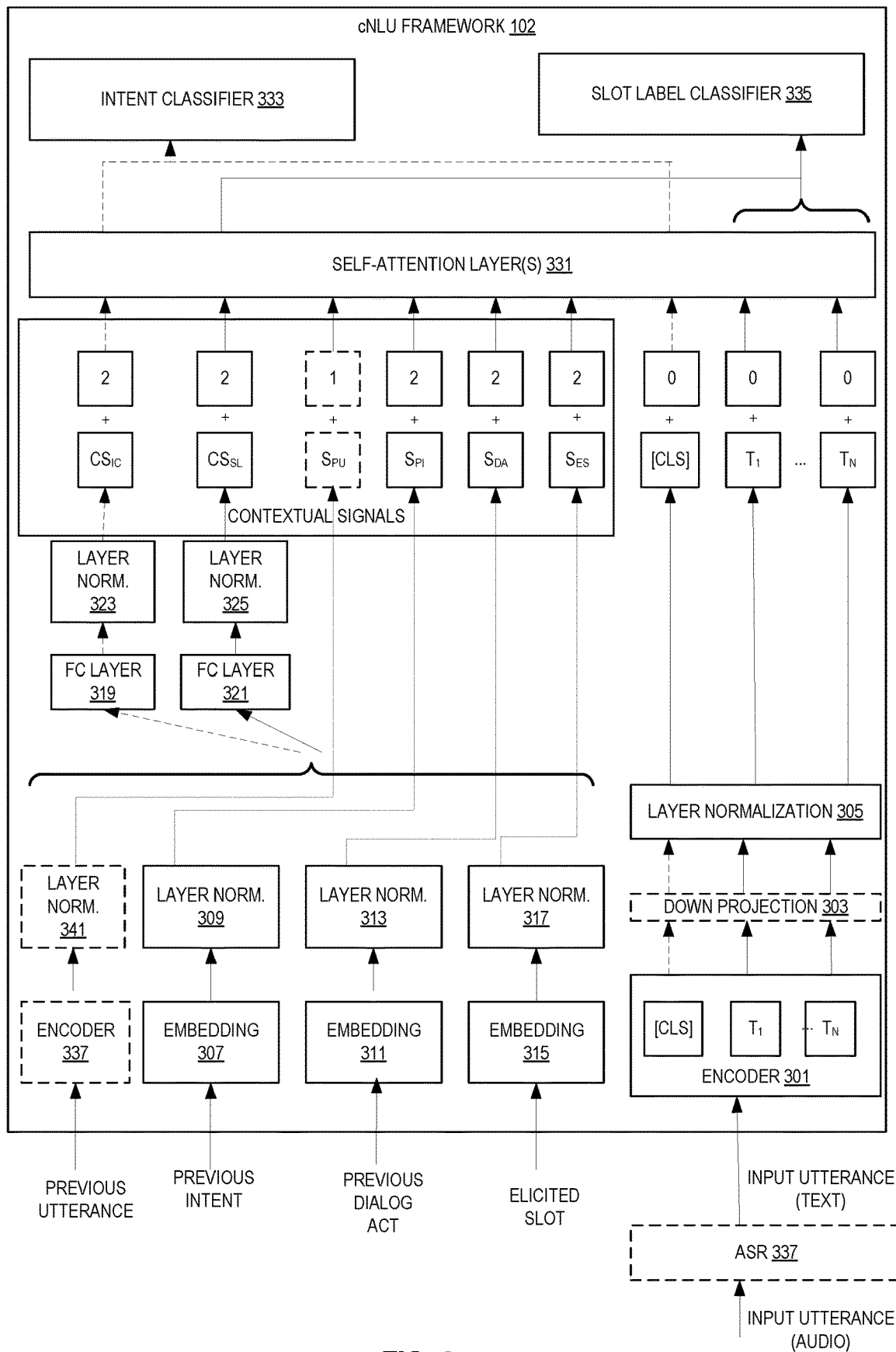
FIG. 3 is a diagram illustrating an example of a contextual natural language understanding framework for joint IC and SL modeling according to some embodiments.

FIG. 3 illustrates embodiments of a cNLU framework for joint IC and SL prediction. Given the current user turn $u_t$, and the corresponding contextual signals as described earlier, the goal is to identify the intent $I_t$ for the current utterance and the slots labels $S_1$-$S_{11}$, $s_{12}, \ldots, s_{1m}$ for each token in the utterance, if the current utterance has m tokens. This information is further utilized by downstream components to fulfill the actual goal as requested by the user.

In particular, a pre-trained language model (LM) produces a contextualized encoding of the input utterance tokens which are fused with encoded contextual signals. Specifically, in some embodiments, a pre-trained BERT model encodes the input utterance, and which is further contextualized using encoding of the conversation contextual signals using a stack of K self-attention layers.

As illustrated, contextual signals of a previous intent (PI), dialog act (DA), and an elicited slot (ES) are discrete input signals into the cNLU framework 102. The PI signifies the intent of previous user turn $u_t$-1 of a conversation and is useful to identify the active intent based on other contextual information, for instance, if the previous intent was fulfilled or not. The DA signifies the action requested by the agent for the current user turn $u_t$ to fulfill the conversation. Examples of dialog acts include, but are not limited to: ConfirmIntent (the agent is expected a yes or no response to confirm the intent before fulfillment), ElicitIntent (the agent wants to elicit the user's intent), ElicitSlot (the agent is expecting the value of a slot for the current intent), Failed (the conversation has failed), Fulfilled (the intent has been fulfilled), and/or ReadyForFulfillment (the client has to fulfill the intent). Note that in some embodiments, the dialog act is called the dialog state. The ES signifies the name of the slot being elicited if the dialog act is ElicitSlot for a current turn. These contextual signals come from the dialog state we may be maintained by one or more of the bot itself, the NLG model 108, the dialog manager 104, and the dialog policy 106.

Each of the contextual signals (PI, DA, and ES) is encoded using embedding layers 307, 311, or 315. The encoded contextual signals are then normalized using normalization layers 309, 313, or 317

The normalized output embeddings $S_{PI}$, $S_{DA}$, and $S_{ES}$ are then combined into at least two different task-specific linear projections using fully connected layers 319 or 321 (the output of which may be normalized using normalization layers 323 or 325).

As such, the normalized output embeddings (S) and contextual signal (CS) encodings are formally defined in some embodiments as:

$$S_{PI} = \text{LayerNorm}_{PI}(\text{Embed}_{PI}(PI))$$

$$S_{DA} = \text{LayerNorm}_{DA}(\text{Embed}_{DA}(DA))$$

$$S_{ES} = \text{LayerNorm}_{ES}(\text{Embed}_{ES}(ES))$$

$$CS_{IC} = [S_{PI}, S_{DA}, S_{ES}]W_{CS_{IC}}^T + b_{CS_{IC}}$$

$$CS_{SL} = [S_{PI}, S_{DA}, S_{ES}]W_{CS_{SL}}^T + b_{CS_{SL}}$$

where [108, •, •] is a concatenation operator and $$W_{CS_{IC}}, b_{CS_{IC}}, W_{CS_{SL}}, \text{ and } b_{CS_{SL}}$$

are learnable parameters.

In some embodiments, the contextual signals include the previous utterance in the conversation. The previous utterance is encoded using encoder 321 (e.g., a BERT-based encoder, LSTM, etc.) to get the CLS sequence and the encoded utterance normalized using layer normalization layer 341. Note that an intermediate down projection may also occur. As such, an additional normalized output embedding would be: $S_{Pu} = \text{LayerNorm}_{Pu}(\text{Embed}_{Pu}(PU))$. This would change the CSes to be:

$$CS_{IC} = [S_{PI}, S_{DA}, S_{ES}, S_{PU}]W_{CS_{IC}}^T + b_{CS_{IC}}$$

$$CS_{SL} = [S_{PI}, S_{DA}, S_{ES}, S_{PU}]W_{CS_{SL}}^T + b_{CS_{SL}}$$

In some embodiments, an input utterance is in an audio format and is subjected to automatic speech recognition (ASR) 337 to generate input utterance text. The input utterance text (whether or not it is from ASR) is subjected to an encoder 301 to determine a CLS token sequence. As shown, a class (CLS) and other tokens per word are encoded. In some embodiments, the encoder 301 is a BERT-based encoder. For each token of the input utterance, in some embodiments, the encoder 301 encodes at a dimensionality that may be excessive considering the limited number of intent classes and slot types to predict. This might also result in too much of dilution in the information, making the learning process harder. As such, in some embodiments, the encoder 301 output encodings are down-projected using a down-projection layer 303 to the same dimensionality of the contextual signal embeddings. A layer normalization 305 is typically then applied. In some embodiments, given the token encoding h generated by the encoder 301, the down-projection t of the same token is computed as:

$$t = \text{LayerNorm}_{DP}(hW_{DP}^T + b_{DP})$$

where $W_{DP}$ and $b_{DP}$ are learnable parameters.

The contextual signal encodings and the utterance token encodings are also associated with a token type embedding. In this example, the contextual signal encodings have a token type embedding of "2" and the utterance token encodings have a token type embedding of "0." The contextual signals are encoded and the (down-projected) token encodings a fused using a stack of one or more self-attention layers 331 (such as transformer layers). The fusion makes the contextual signals attend to the (down-projected) token encodings and allows for the learning of hat to focus on based on the current dialog context. As FIG. 3 shows, in some embodiments, the sequence fed to the self-attention layers is composed of the contextual signal encodings, followed by the normalized output embeddings, which are followed by the (down-projected) token encodings, i.e., <$CS_{IC}, CS_{SL}, S_{PI}, S_{DA}, S_{ES}$, [CLS], $T_1, \ldots, T_n$> or <$CS_{IC}, CS_{SL}, S_{PI}, S_{DA}, S_{ES}, S_{PU}$, [CLS], $T_1, \ldots, T_n$>

The token type (or segment) embeddings model the distinction between context representations and utterance representation.

In some embodiments, the output layer is composed of two task-specific linear classifiers. In some embodiments, other classifier types are utilized for at least one of the classifers. Specifically, the IC classifier 333 is fed with the concatenation of the encodings of $CS_{IC}$ and [CLS] output from the stack of self-attention layers 331. Similarly, for the tokens of the input utterance, the corresponding encoding coming from the stack of self-attention layers 331 is concatenated with the encoding of $CS_{SL}$ and fed to SL classifier 332.

In some embodiments, an encoded sequence from the stack of self-attention layers 331 is:

<$h_{CS_{IC}}, h_{CS_{SL}}, h_{S_{PI}}, h_{S_{DA}}, h_{S_{ES}}, h_{[CLS]}, h_{T_1}, \ldots, h_{T_n}$> or <$h_{CS_{IC}}, h_{CS_{SL}}, h_{S_{PI}}, h_{S_{DA}}, h_{S_{ES}}, h_{S_{PU}}, h_{[CLS]}, h_{T_1}, \ldots, h_{T_n}$>

The IC prediction for input utterance and the SL prediction for the generic token $t_i$ are defined as:

$$y_{IC} = [h_{CS_{IC}}, h_{[CLS]}] W_{IC}^T + b_{IC}$$

$$y_{SL,t_i} = [h_{CS_{SL}}, h_{t_i}] W_{SL}^T + b_{SL}$$

where $W_{IC}, b_{IC}, W_{SL}$ and $b_{SL}$ are learnable parameters.

In some embodiments, a few layers can be truncated from the encoder 301 without impacting model performance on downstream task. How many layers to remove may be determined by removing a fixed number of layers from the top of pre-trained multiple layer encoder (used for encoding user utterances), fine-tuning on the IC-SL task, and then evaluating the performance for each configuration.

In addition to the traditional IC and SL tasks, some production NLU systems also need to be able to detect and reject out-of-scope user utterances. In some embodiments, the intent classifier is trained with an additional out-of-scope (OOS) class with examples sampled from a set of domain-irrelevant utterances.

Figure 4:
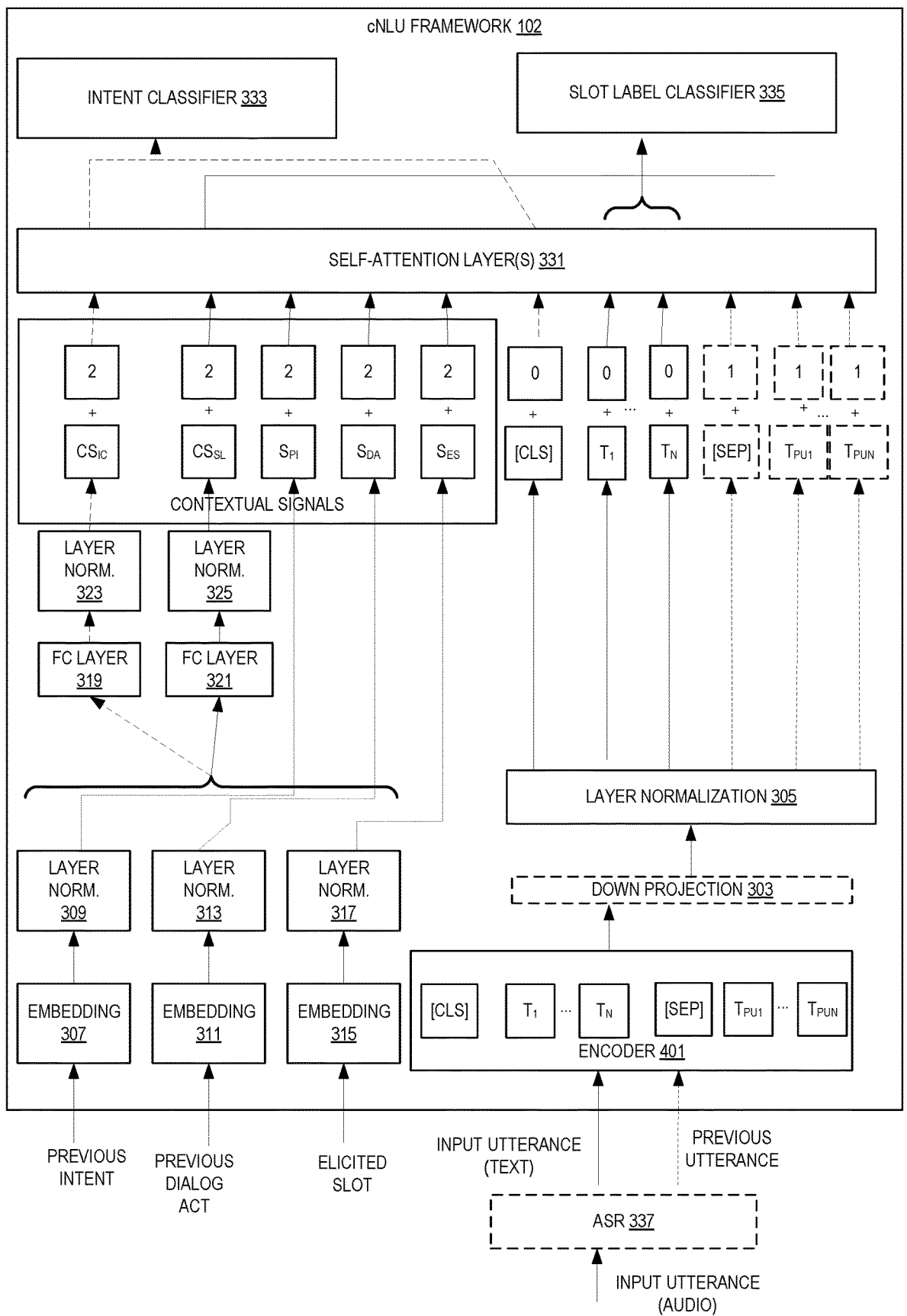
FIG. 4 is a diagram illustrating an example of a contextual natural language understanding framework for joint IC and SL modeling according to some embodiments.

FIG. 4 illustrates embodiments of a cNLU framework for joint IC and SL prediction. The cNLU framework 102 is a modified version of that shown in FIG. 3 and the components that do not change use the same numbering as FIG. 3. In the embodiments of FIG. 4, if a previous utterance is included in the analysis, it is passed through encoder 401. Encoder 401 determines the CLS token sequence of FIG. 3 and a second sequence (kicked off with a SEP token) for a previous utterance determine a token sequence. As shown, a separator (SEP) and other tokens per word are encoded. In some embodiments, the encoder 401 is a BERT-based encoder. For each token of the both utterances, in some embodiments, the encoder 401 encodes at a dimensionality that may be excessive considering the limited number of intent classes and slot types to predict.

Figure 5:
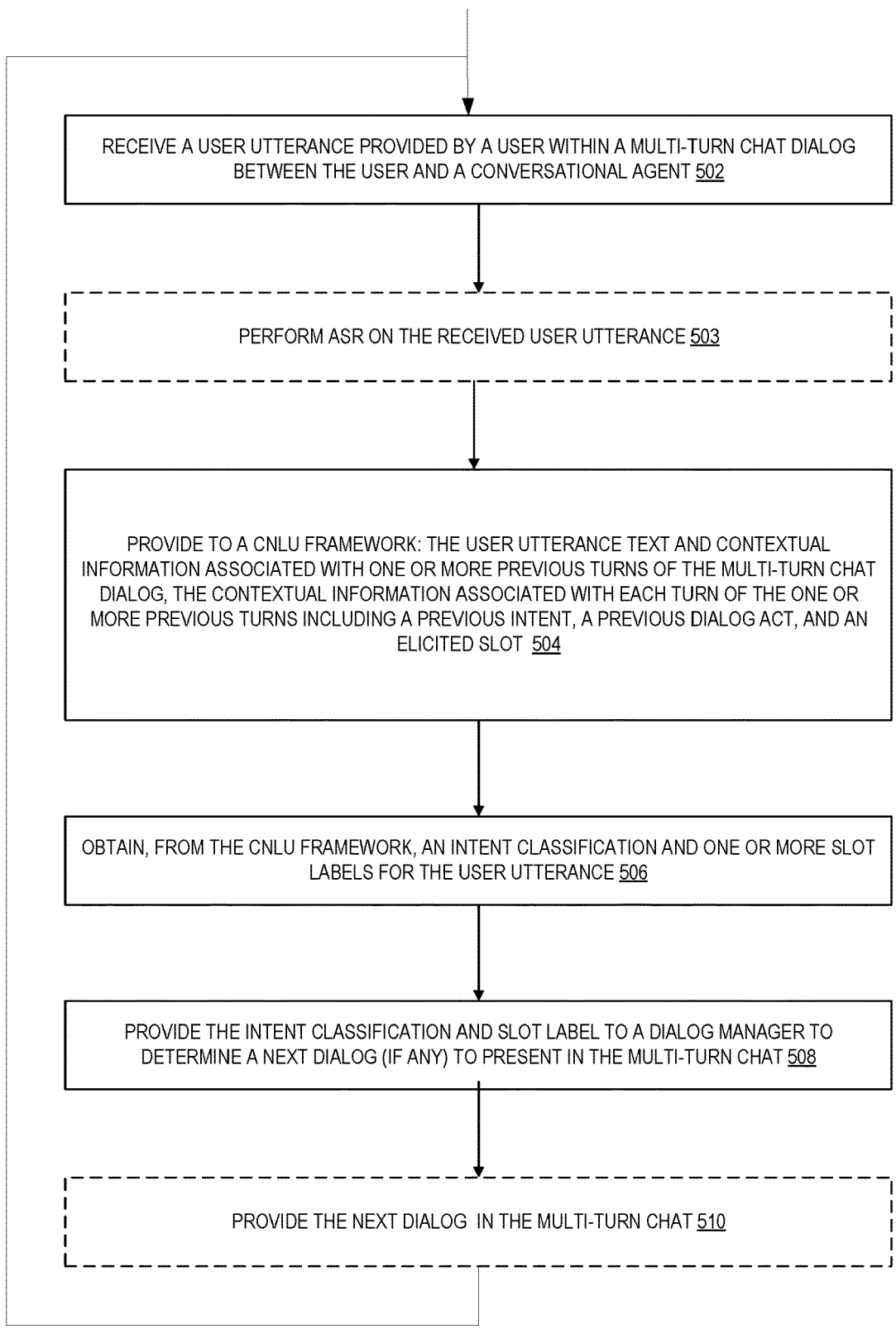
FIG. 5 is a flow diagram illustrating operations of a method for using a contextual natural language understanding framework according to some embodiments.

FIG. 5 is a flow diagram illustrating operations 500 of a method for using a contextual natural language understanding (cNLU) framework that is to perform joint intent classification (IC) and slot labeling (SL) tasks according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by contextual natural language understanding (cNLU) framework of the other figures.

At 502 a user utterance provided by a user within a multi-turn chat dialog between the user and a conversational agent is received.

In some embodiments, at 503, automatic speech recognition (ASR) is performed on an audible user utterance to generate utterance text.

The user utterance text and contextual information associated with one or more previous turns of the multi-turn chat dialog, the contextual information associated with each turn of the one or more previous turns including a previous intent, a previous dialog act, and an elicited slot are provided to the cNLU framework at 504.

At 506, an intent classification and one or more slot labels for the user utterance are obtained from the cNLU framework.

The intent classification and slot label are provided to a dialog manager to determine a next dialog (if any) to present in the multi-turn chat at 508.

In some embodiments, the next dialog is provided in the multi-turn chat at 510. In some embodiments, another action is performed.

Figure 6:
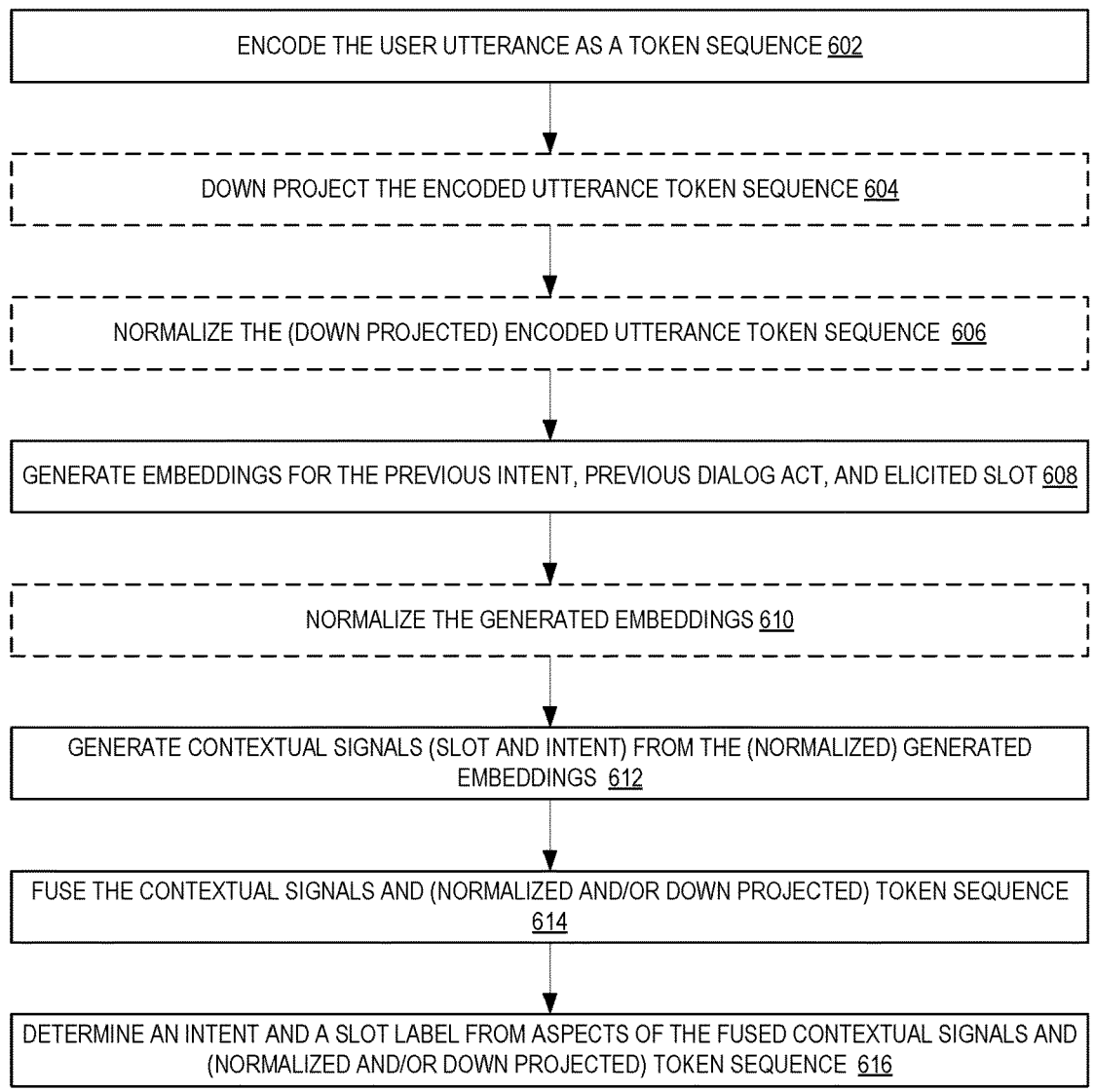
FIG. 6 is a flow diagram illustrating operations of a method for using a contextualized self-attention architecture for joint IC and SL modeling according to some embodiments.

FIG. 6 is a flow diagram illustrating operations 500 of a method of a natural language understanding (cNLU) framework performing joint intent classification (IC) and slot labeling (SL) tasks according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by contextual natural language understanding (cNLU) framework of the other figures. In particular, FIG. 6 illustrates embodiments of action 506 of FIG. 4.

At 602 the user utterance is encoded as a token sequence.

In some embodiments, the token sequence is down projected at 604.

In some embodiments, the (down projected) encoded utterance token sequence is normalized at 606.

At 608, embeddings for the previous intent, previous dialog act, and elicited slot are generated. Additionally, in some embodiments, an encoding of the previous utterance is made.

In some embodiments, the generated embeddings (and encoded previous utterance if present) are normalized at 610. Note that the normalization makes the token sequence and embeddings be the same size.

Contextual signals, both slot and intent, are generated from the (normalized) generated embeddings at 612. As noted above, in some embodiments, one or more fully-connected layers are applied to a combination (e.g., a concatenation) of the (normalized) generated embeddings (and (normalized) encoded previous utterance) and then, in some embodiments, normalized.

The contextual signals and (normalized and/or down projected) token sequence are fused at 614. As detailed, in some embodiments, this fusion is performed using a plurality of self-attention layers.

An intent and a slot label from aspects of the fused contextual signals and (normalized and/or down projected) token sequence at 616. In particular, the fusion of contextual signal for the intent is combined with the class of the input utterance and evaluated by the intent classifier, and the fusion of the contextual signal for the slot label is combined with the token(s) of the user utterance and evaluated by the slot label classifier.

Figure 7:
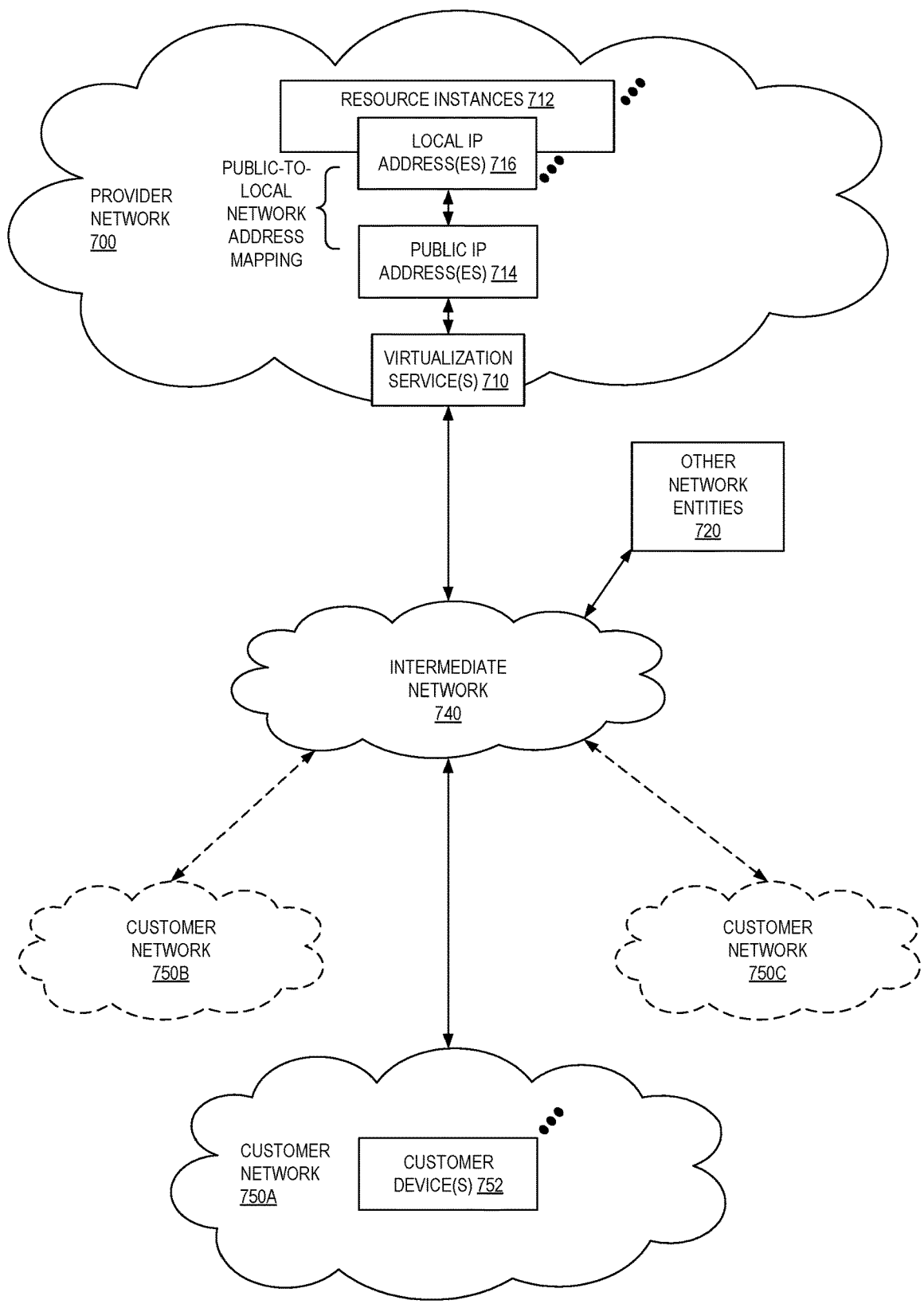
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
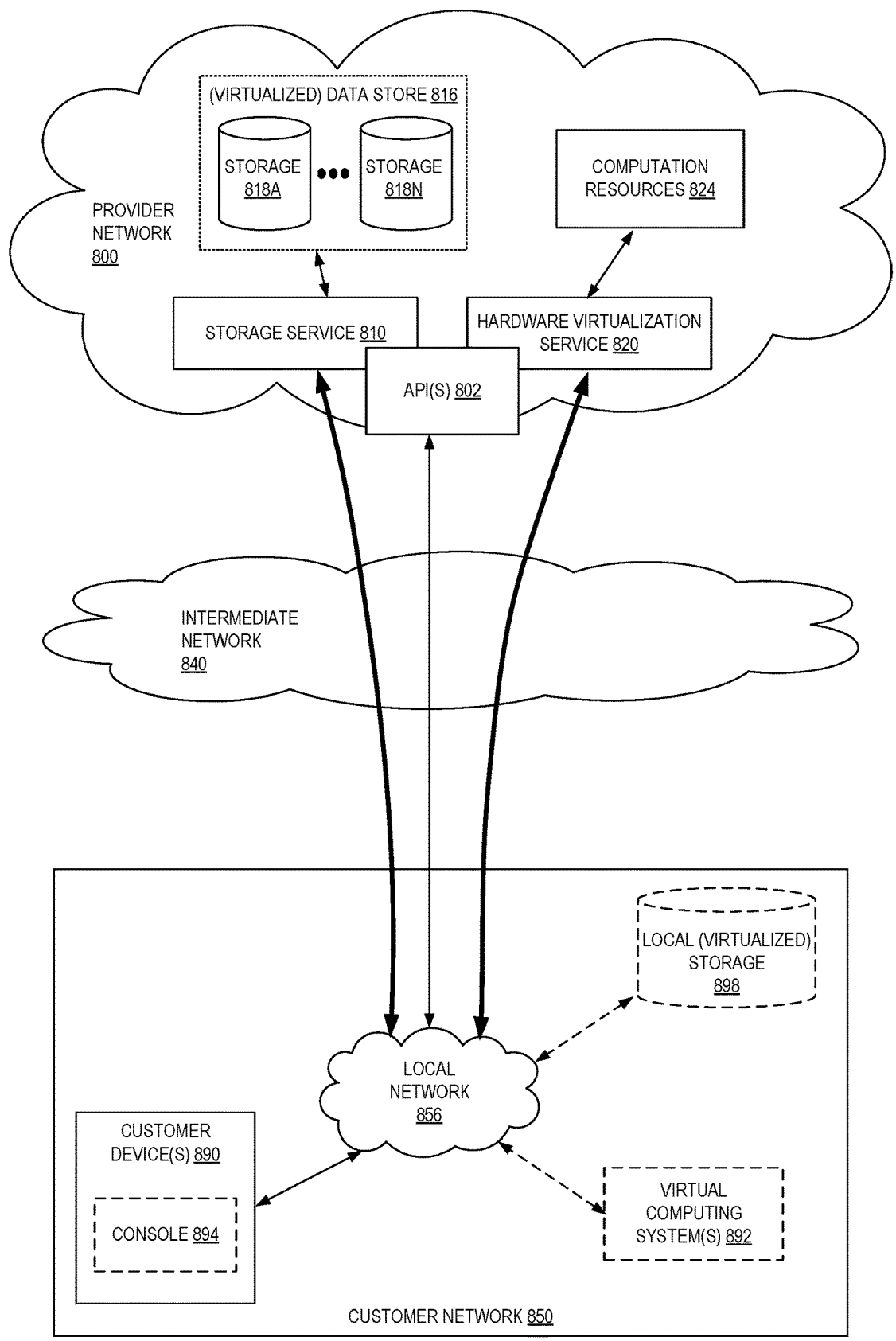
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 702 to request allocation of one or more resource instances within the virtual network or within another virtual network.

Figure 9:
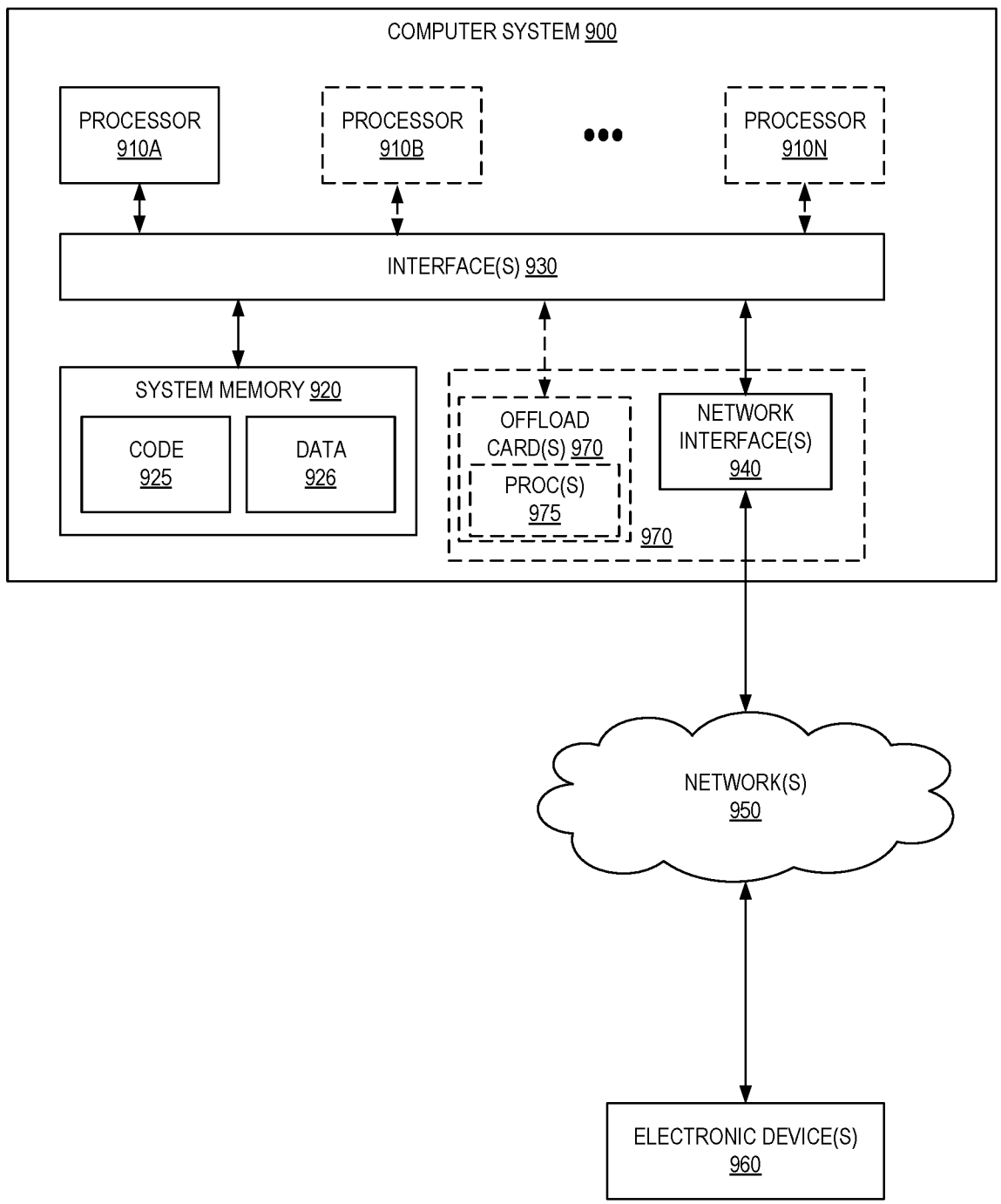
FIG. 9 is a block diagram illustrating an example computer system that may be used in some embodiments.

In some embodiments, a system that implements a portion or all of the techniques for a contextual natural language understanding (cNLU) framework that is able to incorporate contextual signals of variable history length to perform joint intent classification (IC) and slot labeling (SL) tasks as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to (I/O) interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a user utterance provided by a user within a multi-turn chat dialog between the user and a conversational agent;
providing to a contextual natural language understanding framework:
the user utterance, and
contextual information associated with one or more previous turns of the multi-turn chat dialog, the contextual information associated with each turn of the one or more previous turns including a previous intent, a previous dialog act, and an elicited slot; and
obtaining, from the contextual natural language understanding framework, an intent classification and one or more slot labels by:
encoding the user utterance,
generating an intent contextual signal and a slot label contextual signal from the previous intent, the previous dialog act, and the elicited slot,
fusing the encoded user utterance and contextual signals, and
generating the intent classification and the one or more slot labels from the fused encoded user utterance and contextual signals;
providing the intent classification and one or more slot labels to a dialog manager of the multi-turn chat dialog to determine a next dialog; and
providing the next dialog in the multi-turn chat dialog to the user.

2. The computer-implemented method of claim 1, wherein a previous utterance of the multi-turn chat dialog is provided to the contextual natural language understanding framework along with the previous intent, the previous dialog act, and the elicited slot.

3. The computer-implemented method of claim 1, wherein the fusing is performed using a plurality of self-attention layers.

4. A computer-implemented method comprising:
receiving a user utterance provided by a user within a multi-turn chat dialog between the user and a conversational agent;
providing to a contextual natural language understanding framework:
the user utterance, and
contextual information associated with one or more previous turns of the multi-turn chat dialog, the contextual information associated with each turn of the one or more previous turns including a previous intent, a previous dialog act, and an elicited slot; and
obtaining, from the contextual natural language understanding framework, an intent classification and one or more slot labels.

5. The computer-implemented method of claim 4, wherein the contextual natural language understanding framework includes an encoder to encode the user utterance into a sequence of tokens.

6. The computer-implemented method of claim 5, wherein the sequence of tokens is down-projected and normalized.

7. The computer-implemented method of claim 5, wherein the contextual natural language understanding framework includes a plurality of embedding layers to generate embeddings for the previous intent, the previous dialog act, and the elicited slot.

8. The computer-implemented method of claim 7, further comprising:
generating intent and slot label contextual signals from a combination of the generated embeddings.

9. The computer-implemented method of claim 8, further comprising:
assigning a token type to the sequence of tokens, contextual signals, and embeddings.

10. The computer-implemented method of claim 9, further comprising:
fusing the token types, sequence of tokens, contextual signals, and embeddings using a multi-headed attention mechanism, wherein the intent classification and slot label are generated from the fused sequence of tokens, contextual signals, and embeddings.

11. The computer-implemented method of claim 8, further comprising:
fusing the sequence of tokens, contextual signals, and embeddings, wherein the intent classification and slot label are generated from the fused sequence of tokens, contextual signals, and embeddings.

12. The computer-implemented method of claim 8, further comprising:
fusing the sequence of tokens and contextual signals, wherein the intent classification and slot label are generated from the fused sequence of tokens and contextual signals.

13. The computer-implemented method of claim 4, wherein a previous utterance of the multi-turn chat dialog is provided to the contextual natural language understanding framework along with the previous intent, the previous dialog act, and the elicited slot.

14. The computer-implemented method of claim 4, wherein the intent classification and slot label are generated by two task-specific linear classifiers.

15. The computer-implemented method of claim 4, further comprising:
providing the intent classification and one or more slot labels to a dialog manager of the multi-turn chat dialog to determine a next dialog; and
providing the next dialog in the multi-turn chat dialog to the user.

16. The computer-implemented method of claim 4, wherein the contextual natural language understanding framework is part of a dialog system running as a web-based service, and wherein the method further comprises providing, by the web-based service, one or more responses to the user based at least in part on the intent classification and the one or more slot labels.

17. A system comprising:
a dialog system implemented by a first one or more electronic devices to engage in an agent-user chat dialog; and
a contextual natural language understanding (cNLU) framework implemented by a second one or more electronic devices, the cNLU framework including instructions that upon execution cause the cNLU framework to:
receive a user utterance provided by a user within a multi-turn chat dialog between the user and a conversational agent;
provide to a contextual natural language understanding framework:
the user utterance, and
contextual information associated with one or more previous turns of the multi-turn chat dialog, the contextual information associated with each turn of the one or more previous turns including a previous intent, a previous dialog act, and an elicited slot; and
obtain, from the contextual natural language understanding framework, an intent classification and one or more slot labels.

18. The system of claim 17, wherein a previous utterance of the multi-turn chat dialog is provided to the contextual natural language understanding framework along with the previous intent, the previous dialog act, and the elicited slot.

19. The system of claim 17, wherein the intent classification and slot label are generated by two task-specific linear classifiers.

20. The system of claim 17, wherein the cNLU framework is further to:
fuse the token types, sequence of tokens, contextual signals, and embeddings using a multi-headed attention mechanism, wherein the intent classification and slot label are generated from the fused sequence of tokens, contextual signals, and embeddings.

* * * * *